United States Patent
Beuschel et al.

(10) Patent No.: US 12,442,903 B2
(45) Date of Patent: Oct. 14, 2025

(54) METHOD FOR ANALYZING BACKSCATTER HISTOGRAM DATA IN AN OPTICAL PULSE RUNTIME METHOD AND DEVICE FOR DATA PROCESSING

(71) Applicant: Microvision, Inc., Redmond, WA (US)

(72) Inventors: Ralf Beuschel, Friedrichshafen (DE); Falko Diebel, Hamburg (DE)

(73) Assignee: Microvision, Inc., Redmond, WA (US)

( * ) Notice: Subject to any disclaimer, the term of this patent is extended or adjusted under 35 U.S.C. 154(b) by 371 days.

(21) Appl. No.: 17/797,085

(22) PCT Filed: Feb. 1, 2021

(86) PCT No.: PCT/EP2021/052285
§ 371 (c)(1),
(2) Date: Aug. 2, 2022

(87) PCT Pub. No.: WO2021/160454
PCT Pub. Date: Aug. 19, 2021

(65) Prior Publication Data
US 2023/0048750 A1  Feb. 16, 2023

(30) Foreign Application Priority Data
Feb. 11, 2020  (DE) .......... 102020201637.2

(51) Int. Cl.
*G01S 7/4865* (2020.01)
*G01S 7/48* (2006.01)
*G01S 7/487* (2006.01)

(52) U.S. Cl.
CPC .......... *G01S 7/4866* (2013.01); *G01S 7/4873* (2013.01); *G01S 7/4802* (2013.01)

(58) Field of Classification Search
CPC ..... G01S 7/4866; G01S 7/4873; G01S 7/4802
See application file for complete search history.

(56) References Cited

U.S. PATENT DOCUMENTS

| 6,498,647 B1 * | 12/2002 | Kuehnle | G01S 17/95 250/574 |
| 2003/0107742 A1 * | 6/2003 | Tualle | A61B 5/0059 356/450 |
| 2016/0033644 A1 | 2/2016 | Moore | |
| 2016/0258808 A1 * | 9/2016 | Cedilnik | G01J 1/0425 |

(Continued)

FOREIGN PATENT DOCUMENTS

| DE | 102018212542 A1 | 1/2020 |
| EP | 2189804 | 11/2008 |

(Continued)

OTHER PUBLICATIONS

Engler et al., Sensor and method for detecting and determining the distance between objects, 2018, EP3435117B1, English Translation downloaded from Espacenet. (Year: 2018).*

(Continued)

*Primary Examiner* — Lina Cordero
*Assistant Examiner* — Lyudmila Zaykova-Feldman
(74) *Attorney, Agent, or Firm* — Kevin D. Wills

(57) ABSTRACT

A method for analyzing backscatter histogram data in an optical pulse runtime method, including the steps of receiving backscatter histogram data; and analyzing the received backscatter histogram data.

20 Claims, 6 Drawing Sheets

(56) References Cited

U.S. PATENT DOCUMENTS

| | | | |
|---|---|---|---|
| 2018/0024343 A1* | 1/2018 | Chenegros | G01N 21/53 |
| | | | 600/479 |
| 2018/0164415 A1* | 6/2018 | Buckley | G01S 17/18 |
| 2018/0180535 A1* | 6/2018 | Sorgato | G01N 21/4795 |
| 2018/0259624 A1* | 9/2018 | Kiehn | G01S 7/4815 |
| 2019/0361098 A1* | 11/2019 | Hollmann | G01S 7/4863 |
| 2020/0191958 A1* | 6/2020 | Ikuta | G01S 7/4865 |
| 2020/0195833 A1* | 6/2020 | Sivan | G06F 3/013 |
| 2020/0233068 A1* | 7/2020 | Henderson | H04N 25/773 |
| 2020/0319310 A1* | 10/2020 | Hall | G01S 17/42 |
| 2020/0341144 A1* | 10/2020 | Pacala | G01S 17/894 |
| 2021/0103055 A1* | 4/2021 | Allen | G01S 17/10 |
| 2021/0382964 A1* | 12/2021 | Moore | G06F 11/0703 |
| 2023/0003938 A1* | 1/2023 | Zilkie | A61B 5/14552 |
| 2025/0102295 A1* | 3/2025 | Binder | G01S 15/08 |

FOREIGN PATENT DOCUMENTS

| | | | | |
|---|---|---|---|---|
| EP | 3370079 A1 * | 9/2018 | | G01S 17/10 |
| EP | 3435117 | 10/2018 | | |
| EP | 3435117 B1 * | 9/2019 | | G01S 17/42 |
| EP | 2189804 A1 | 5/2020 | | |
| JP | 2018-169384 | 1/2018 | | |
| JP | 2018-91760 | 6/2018 | | |
| WO | WO2020009011 | 1/2020 | | |

OTHER PUBLICATIONS

International Search Report for International application No. PCT/EP2021/052285 dated Apr. 26, 2021.
German Search Report for application No. 102020201637.2 dated Apr. 1, 2022.

* cited by examiner

METHOD FOR ANALYZING BACKSCATTER HISTOGRAM DATA IN AN OPTICAL PULSE RUNTIME METHOD AND DEVICE FOR DATA PROCESSING

The present invention generally relates to a method for analyzing backscatter histogram data in an optical pulse runtime method, and a device for data processing.

Generally known are various optical pulse runtime methods (e.g., optical runtime measurement), which can be based upon the so-called time-of-flight principle, in which the runtime of an emitted light signal reflected by an object is measured, so as to determine the distance to the object on the basis of the runtime.

Known is the use of sensors in the motor vehicle environment based upon the so-called LIDAR (light detection and ranging) principle, in which the environment is scanned by periodically emitting pulses and detecting the reflected pulses. For example, a corresponding method and a device are known from WO 2017/081294.

In LIDAR applications in the motor vehicle environment, the amount of ambient light can be comparatively large under certain environmental conditions, e.g., while driving during the day, which can reduce the signal-to-noise ratio (also referred to as SNR, signal-to-noise ratio). In such situations, the detection range of the LIDAR application can also be limited.

In general, the type of detected light signals can differ in LIDAR applications, e.g., depending on whether the emitted light signal is reflected by a solid object (object backscatter) or scattered back by particles in the air (diffuse backscatter), for example in fog or exhaust gases. Conclusions can be drawn from the recorded backscatter data about the environmental conditions. Even if solutions for analyzing backscatter data in an optical pulse runtime method are known from prior art, an object of the present invention is to provide a method for analyzing backscatter histogram data in an optical pulse runtime method and a device for data processing.

This object is achieved by the method according to claim 1 and the device according to claim 15.

In a first aspect, the present invention provides a method for analyzing backscatter histogram data in an optical pulse runtime method, comprising: Receiving backscatter histogram data; and analyzing the received backscatter histogram data.

In a second aspect, the present invention provides a device for data processing, comprising means for implementing the method according to the first aspect.

As mentioned, several exemplary embodiments relate to a method for analyzing backscatter histogram data in an optical pulse runtime method, comprising:

Receiving backscatter histogram data; and analyzing the received backscatter histogram data.

As stated at the outset, conclusions can be drawn from backscatter data about environmental conditions (e.g., fog or other particles in the air, smoke, spray, etc.) in LIDAR measurements. The detection events of the backscattered light are here unrelated to solid objects. A more precise knowledge of the environmental conditions makes it possible to adjust the driving style according to the environmental conditions, and thereby increase safety, e.g., for autonomously driving motor vehicles. In addition, a precise knowledge of diffuse backscatter during LIDAR measurements also allows a (more precise) detection of solid objects in several exemplary embodiments. For example, this makes it possible to determine traffic situations more precisely, which likewise increases the safety and reliability of autonomous vehicles.

A more precise knowledge of the backscatter signal and an amount of ambient light can also help determine an effective detection range for a LIDAR measurement. During the detection of solid objects, this makes it possible to better assess whether the latter is reliable. This increases the probability of correctly identifying an object from the measurement data, which likewise increases the safety and reliability of autonomous vehicles.

In several exemplary embodiments, the method is for this reason used for analysis in a LIDAR system or the like, and employed in the motor vehicle environment, for example, without the invention being limited to these cases. In several exemplary embodiments, LIDAR data typically contain signal contributions from diffuse backscatter, light reflection on objects, ambient light, interference light signals from other light sources in the environment, and the like. These data can be displayed in a histogram, as basically known.

In several exemplary embodiments, the analysis of backscatter histograms can correspondingly mean that the signal contributions of diffuse backscatter, the ambient light quantity and the effective detection range can be determined from these data during an optical runtime measurement (optical pulse runtime method). Therefore, the backscatter histogram data can be suitable for such an analysis and determination, since they basically can contain the signal contributions of the diffuse backscatter and ambient light quantity.

In several exemplary embodiments, the optical runtime measurement is based upon the so-called TCSPC (time correlated single photon counting) measuring principle, in particular in exemplary embodiments based upon LIDAR. Light pulses are here periodically emitted, which typically are a few nanoseconds long, and mark a starting time of a measurement. During the time until the next light pulse (measurement time), the light reflected by objects or backscattered light is detected by a light-detecting receiving element (e.g., a single photon avalanche diode (SPAD)), wherein light can likewise be detected in a short time range before emitting the light pulses. The measurement time is here divided into a plurality of short time intervals (e.g., 500 ps). Each time interval can have allocated to it a point in time that corresponds to a time distance to the starting time (e.g., at time intervals of 500 ps, a time of 250 ps can be allocated to a first time interval, and a time of 750 ps can be allocated to a second time interval, etc.).

Depending on the distance to the object or point of the backscatter, the light reaches the light-detecting receiving element at different times. It here generates an electrical signal in the light-detecting receiving element. A time-to-digital converter (also referred to as "TDC", time-to-digital converter), which is basically known, can then be used to allocate the electrical signal to one of the time intervals. Counting the electrical signals ("events") allocated to a time interval yields so-called histograms or time-correlated histograms (also referred to as TCSPC histograms), wherein these histograms can also be present solely as pure data, for example, and are stored as value pairs comprised of the time interval and accompanying number of entries (events or events), for example. Accordingly, the time intervals together with the number of events allocated to each time interval comprise histogram data, which can basically be represented by digital signals (or also analog signals).

In LIDAR measurements based on TCSPC, histogram data of the back-reflected or scattered light can thus be output with a high time resolution. This can correspond to an analog-to-digital conversion of the back-reflected or scattered light output as a function of time and or distance. In several exemplary embodiments, time-correlated histogram data are those data which are generated based upon the electrical signals of the light-detecting receiving elements within the (accompanying) measurement time and shortly before. Therefore, these typically contain signal contributions comprised of the diffuse backscatter, light reflection on objects, ambient light, interference light signals from other light sources in the environment, and the like.

In several exemplary embodiments, the backscatter histogram data here correspond to an accumulation of time-correlated histogram data from several light-detecting receiving elements. The accumulation of time-correlated histogram data can be advantageous for determining various parameters of the measurement (analysis of the backscatter histogram data), since the signal-to-noise ratio (also referred to as "SNR", signal-to-noise ratio) of the diffuse backscatter contribution and the contribution of the ambient light can be increased by comparison to other signal contributions (e.g., reflection on objects or interference light sources). In several exemplary embodiments, this makes it possible to better perform the analysis of backscatter histogram data.

In some exemplary embodiments, this stems from the fact that an accumulation of several time-correlated histogram data (backscatter histogram data) can smear the reflection of objects (signal contributions by objects) at different distances and/or in different regions of the visual field of the LIDAR measurement. In such exemplary embodiments, the objects are often typically only present in a narrow range of the visual field, wherein the visual field typically describes a room area that is being detected. By contrast, the contributions of the diffuse backscatter and ambient light are typically similar over the entire visual field of the LIDAR system.

During the measurement time, the ambient light is likewise constant as a rule, and thus typically makes a constant contribution in all time intervals. The signal contributions of reflections on objects are also often sharp peaks, meaning that the reflected light is detected only in one or a few time intervals, because the light pulse can be received with a weakened amplitude but nearly identical pulse duration. For example, at typical pulse durations of 10 ns, a 250 ps time resolution can be required for a precise localization.

During a diffuse backscatter, e.g., on fog or particles in the air, a continuous backscatter can arise during the propagation of light with a low intensity. The light pulse can here be very heavily expanded or smeared in time. For example, given a 10 ns light pulse with a geometric expansion of 1.5 m, a diffuse backscatter over a 1.5 m depth range can be generated at any time. For this reason, a clearly reduced time resolution is sufficient in some exemplary embodiments.

In some exemplary embodiments, the backscatter histogram data are generated by one or several histogram accumulation units, and provided for analysis. The histogram accumulation unit has several signal inputs. The histogram accumulation unit receives time-correlated histogram data at the or each signal input. The histograms need here not always be received at each signal input, and some exemplary embodiments provide even more signal inputs at which histogram data are not received or only received according to a corresponding configuration. Backscatter histogram data are generated based upon the time-correlated histograms received at the signal inputs.

In some exemplary embodiments, the maximum number of histogram accumulation units is determined by the number of light-detecting receiving elements in a system for optical runtime measurement (e.g., LIDAR system). The histogram accumulation unit can here basically be or have an electronic circuit or electronic circuitry, which receives digital signals or data, e.g., the time-correlated histograms, via the signal inputs, and generate backscatter histogram data as described herein. The electronic circuit can contain electronic components, digital storage elements and the like, so as to perform the functions described herein. The electronic circuit can be realized by an FPGA (field programmable gate array), DSP (digital signal processor) or the like. In other exemplary embodiments, the histogram accumulation unit is realized by a memory and a microprocessor. In other exemplary embodiments, the histogram accumulation unit is realized by a software, wherein the signal inputs correspond to the parameters/attributes of a software function/method in such exemplary embodiments. The generation of the backscatter histogram data then corresponds to the execution of a sequence of commands for performing specific arithmetic operations on a computer, so that backscatter histogram data are present after all commands have been processed. In some exemplary embodiments, the histogram accumulation unit is also realized by a mixture of hardware and software-based components, on which the functionalities described herein are correspondingly distributed.

In some exemplary embodiments, the histogram accumulation unit generates the backscatter histogram data by adding together the received time-correlated histogram data. The number of events that were detected in a time interval ("bin") can here be added together from all received time-correlated histogram data, so that the backscatter histogram data that in each time interval contain precisely the sum of all events in this time interval are generated. The time-correlated histogram data are preferably accumulated or added as integers, thereby making it possible to measure a backscatter that in some exemplary embodiments is weakly diffuse. This is advantageous, since the SNR of the diffuse backscatter contributions can be increased by comparison to other contributions.

In some exemplary embodiments, the histogram accumulation unit calculates an arithmetic mean from the received time-correlated histogram data, so as to generate the backscatter histogram data.

The received time-correlated histogram data are here added together and divided by the number of signal inputs. This can be advantageous in some exemplary embodiments that have a fixed point and floating point number realization (as opposed to exemplary embodiments that accumulate integers).

In some exemplary embodiments, the histogram accumulation unit accumulates the received time-correlated histogram data of several time intervals into one time interval, so as to generate the backscatter histogram data. In some exemplary embodiments, the histogram accumulation unit is further set up to not consider received time-correlated histogram data of time intervals that exceed a specific time threshold for generating the backscatter histogram data.

In some exemplary embodiments, the histogram accumulation unit is further set up to weight the received time-correlated histogram data for generating the backscatter histogram data.

In some exemplary embodiments, the histogram accumulation unit is further set up to output the backscatter histogram data for determining the backscatter. For example, the backscatter histogram data can then be output to a processor, FPGA, or the like for determining the backscatter.

In some exemplary embodiments, a receiving system used for optical runtime measurement, e.g., such as a LIDAR system, can have a receiving matrix with several light-detecting receiving elements, wherein each of the light-detecting receiving elements is set up to detect light, and generate an electrical signal in response thereto.

In some exemplary embodiments, each of the light-detecting receiving elements can be activated and deactivated. In some exemplary embodiments, the light-detecting receiving elements in the receiving matrix are arranged in columns and in rows (as basically known), wherein the same number of light-detecting receiving elements is provided in each row in some exemplary embodiments, without limitation of generality.

In some exemplary embodiments, the device comprises several evaluation units, where a respective evaluation unit is connected with the light-detecting receiving elements in a column or a respective evaluation unit is connected with the light-detecting receiving elements in a row.

In some exemplary embodiments, each of the evaluation units is set up to generate the time-correlated histogram data based upon the electrical signals of the light-detecting receiving elements.

In some exemplary embodiments, only the activated light-detecting receiving elements are considered for generating the time-correlated histogram data.

In some exemplary embodiments, each signal input of a histogram accumulation unit is connected with one of the evaluation units, so that the time-correlated histogram data are transmitted from the evaluation unit to the corresponding histogram accumulation unit.

In the method for analyzing backscatter histogram data during an optical runtime measurement, backscatter histogram data are initially received. These backscatter histogram data were generated by the histogram accumulation unit(s).

The received backscatter histogram data are analyzed. An analysis can here involve a calculation or a sequence of calculations for determining various parameters (backscatter signal, ambient light quantity, effective detection range, etc.) of the optical runtime measurement. The calculation here takes the backscatter histogram data as input values for mathematical operations, e.g., arithmetic averaging or application of a predefined function or the like.

The received backscatter histogram data can here basically be analyzed by a processor, an FPGA, DSP, or the like. In such exemplary embodiments, the analysis is realized by a software. The analysis of backscatter histogram data then corresponds to executing a sequence of commands for performing specific arithmetic operations on a computer, so that the backscatter histogram data have been analyzed upon processing all commands. In other exemplary embodiments, a specific electronic circuit with corresponding electronic components can be provided for analyzing the backscatter histogram data. In some exemplary embodiments, the analysis of backscatter histogram data is realized by a mixture of hardware and software-based components, to which the method described herein is correspondingly distributed. The aforementioned exemplary embodiments can be exemplary embodiments of a device for data processing that can additionally also contain storage elements for data storage.

The quantity of light that is detected based upon diffuse backscatter is frequently low by comparison to the quantity of ambient light, e.g., in daylight, and the quantity of light reflected on objects, so that determining the backscatter can be difficult and imprecise. In some exemplary embodiments, this is why the method for analyzing backscatter histogram data that correspond to accumulated time-correlated histogram data is used for determining a backscatter signal during an optical runtime measurement.

The diffuse backscatter is typically higher at short distances (e.g., 5 m) than at long distances (e.g., 200 m), and can drop off continuously. In some exemplary embodiments, the diffuse backscatter during an optical runtime measurement can thus have a typical signal form, which can have a maximum of backscattered light at short distances, and drops off quickly for longer distances. In such exemplary embodiments, the backscatter signal in the backscatter histogram data then correlates with the typical signal form. This is advantageous, since the backscatter signal can be identified based upon the signal form at short distances. However, in such exemplary embodiments, the backscatter signal can often also not be determined given the presence of an object at short distances.

Consequently, in some exemplary embodiments for analyzing the received backscatter histogram data, a similarity measure, e.g., a correlation, is calculated between the received backscatter histogram data and a predefined reference backscatter signal, so as to determine a backscatter signal.

The correlation can be a measure for the similarity between two or several time or spatial signal progressions or for a statistical connection between the signal progressions. In some exemplary embodiments, the correlation is calculated by a correlation integral, which is basically known.

The predefined reference backscatter signal can correspond to a typical signal form for the backscatter, wherein the typical signal form for backscatter can differ in the various exemplary embodiments. In some exemplary embodiments, the predefined reference backscatter signal can be present as histogram data in a memory, which is accessible for analyzing the backscatter histograms, e.g., via a processor. In other exemplary embodiments, the predefined reference backscatter signal can be calculated from a predefined function dynamically (e.g., at the required time during the analysis).

For example, the typical signal form for backscatter can be determined by searching in short distances for a characteristic peak or a sequence of peaks, wherein the position, signal form and intensity are evaluated. For example, the backscatter has a system-dependent signal form and position of the peak in exemplary embodiments with a LIDAR system for optical runtime measurement, which has a parallax between a transmitter (from which light pulses are emitted) and a receiver (e.g., a receiving matrix with several light-detecting receiving elements). In such exemplary embodiments, whether the intensity of the peak corresponds to an object or not can be checked, so as to determine the typical signal form. Typical reference backscatter signals are illustrated on FIG. 1, FIG. 2, and FIG. 3, for example, which will be described in even more detail further below. For example, a distinction can be made between single beam and multibeam LIDAR systems (single beam systems only emit one light pulse (beam) at the same time, and multibeam systems can simultaneously emit several light pulses from different positions, such as the LIDAR system described in DE 10 2017 222 971 A1).

In other exemplary embodiments, the reference backscatter signal can be experimentally determined by simulating various environmental conditions and measuring the typical signal form, position, and intensity of the backscatter.

In other exemplary embodiments, the reference backscatter signal can be determined by calculating a correlation integral (cross correlation) between an expected backscatter signal and the received backscatter histogram data. In such exemplary embodiments, the level of correlation can be used to evaluate whether the expected backscatter signal can be used as the reference backscatter signal. Several expected backscatter signals can here be tested, and the level of correlation can be compared, so as to determine a reference backscatter signal for the specific system.

In exemplary embodiments where the correlation between the received backscatter histogram data and the predefined reference backscatter signal is calculated by a correlation integral, a backscatter signal that varies in time over the measurement time (and shortly before) arises, wherein the amplitude of the calculated backscatter signal corresponds to the backscattered light output (also abbreviated AB below). For this reason, the backscatter can be determined from the backscatter histogram data in such exemplary embodiments.

In some exemplary embodiments, the method for analyzing backscatter histogram data is used to determine an ambient light quantity from the received backscatter histogram data.

The ambient light quantity (also abbreviated as AL below) basically corresponds to the signal contribution, e.g., in a LIDAR system, which is present as the result of sunlight or streetlamps independently of the emitted light pulse and is detected. In addition, the ambient light quantity can also contain portions of an electronic noise of the receiver, which depends on the temperature. In such exemplary embodiments, however, the effect of contributions to the ambient light quantity from ambient light and noise is identical, and thus not differentiated.

During the measurement time (and shortly before), the ambient light is as a rule constant, and thus typically yields a constant contribution in all time intervals. The signal contributions of reflections on objects are also frequently sharp peaks, meaning that the reflected light is only detected in one or a few time intervals. For this reason, the ambient light quantity can in some exemplary embodiments be determined from the received backscatter histogram data of several time intervals, which lie shortly before the emission of light pulses (starting time). In other exemplary embodiments, the ambient light quantity can be determined from the received backscatter histogram data of several time intervals that correspond to a long distance (as long as no objects are present in long distances). In further exemplary embodiments, the ambient light quantity can be determined from combination of above methods. In several exemplary embodiments, the method for analyzing the received backscatter histogram data is used to determine an effective detection range for the optical runtime measurement based upon the backscatter signal and ambient light quantity.

An effective detection range (also referred to as EDR below) for an optical runtime measurement can correspond to a distance at which the signals that arise through reflection on solid objects can still be clearly detected and allocated. The effective detection range is here basically referenced to an object with a predefined reflectivity at a predefined ambient light quantity and predefined constant probability of a light detection.

In some exemplary embodiments, the effective detection range can correspond to an absolute value (e.g., 100 m). In other exemplary embodiments, the effective detection range can correspond to a relative value, wherein the effective detection range in such exemplary embodiments is related to a nominal detection range, which was determined for the above reference values.

The effective detection range can be decreased by having the backscatter be high, since in such exemplary embodiments the light output of the emitted light pulse is dampened by the backscatter with increasing distance. As a consequence, the light output available for reflection on solid objects is less than in exemplary embodiments with a lower backscatter, so that the reflected light output is lower, and reduced once again on the way to the receiver.

In exemplary embodiments with a high ambient light quantity, the effective detection range can be reduced by virtue of the SNR dropping, since the ambient light quantity basically contributes to the level of noise. In other exemplary embodiments, the effective detection range is increased at a low ambient light quantity, since this increases the SNR. For this reason, the effective detection range of the optical runtime measurement can be determined from the received backscatter histogram data based upon the backscatter signal and ambient light quantity.

In some exemplary embodiments, a transformation function is applied to the backscatter signal, so as to determine a signal damping factor.

As stated above, a high backscatter can diminish the effective detection range via a damping of the light output of the emitted light pulse with increasing distance. For this reason, the backscatter signal can be used to determine the size of such a damping.

As a consequence, a transformation function is applied to the backscatter signal, wherein the transformation function in some exemplary embodiments can be a predefined (mathematical) function, which calculates a signal damping factor from the backscatter signal. In other exemplary embodiments, the transformation function can be a sequence of calculations. The transformation function can be determined experimentally, or gained from experience. In some exemplary embodiments, the experimental determination can take place beforehand during development, and key figures and/or characteristic curves corresponding to the transformation function can be stored in a software, for example.

In some exemplary embodiments, the signal damping factor can then be the distance-dependent percentage decrease in light output caused by the backscatter.

For this reason, the transformation function was experimentally determined in some exemplary embodiments. For example, the signal damping can have been measured under various environmental conditions, thus making it possible to find a transformation function that determines the signal damping factor from the backscatter signal (which can also be determined experimentally as stated above), which matches well with the measured values for signal damping.

In some exemplary embodiments, an arithmetic mean is calculated from the received backscatter histogram data of several time intervals that lie before a starting time, so as to determine the ambient light quantity.

The starting time is here the time at which the light pulse for determining the distance of solid objects is emitted. Since only the ambient light can be detected shortly before emitting the light pulse (e.g., 20 ns), it is advantageous for determining the ambient light quantity in some exemplary embodiments to consider those time intervals for the received backscatter histogram data that lie before the starting time. Furthermore, it is advantageous to calculate an arithmetic mean from several time intervals, so as to balance out statistical fluctuations in ambient light, and thereby obtain a more precise value for the ambient light quantity. However, the ambient light quantity determined in such exemplary embodiments can be falsified by the reflection on very distant objects.

In some exemplary embodiments, an arithmetic mean is calculated from the received backscatter histogram data of several time intervals that exceed a specific time threshold, so as to determine the ambient light quantity.

The diffuse backscatter during an optical runtime measurement can typically no longer be detected at long distances, since the light quantity is too low. In addition, after the light pulse has hit the road surface or a solid object, for example, a constant ambient light quantity can be detected, e.g., in a LIDAR system, since the light energy or light output was absorbed or reflected.

For this reason, it is advantageous for determining the ambient light quantity in some exemplary embodiments to consider those time intervals for the received backscatter histogram data that exceed a specific time threshold (e.g., as of a time threshold corresponding to a distance of 20 m). In addition, it is advantageous to calculate an arithmetic mean from several time intervals, so as to balance out statistical fluctuations of the ambient light, and thereby obtain a more precise value for the ambient light quantity. However, the ambient light quantity determined in such exemplary embodiments can be falsified by the reflection on distant objects.

In several exemplary embodiments, an arithmetic mean is calculated from the received backscatter histogram data of several time intervals that lie before a starting time, and from the received backscatter histogram data of several time intervals that exceed a specific time threshold, so as to determine the ambient light quantity.

In such exemplary embodiments, the two methods described above are combined, so as to determine the ambient light quantity. This is advantageous, since a potential influence of very distant objects on determining the ambient light quantity becomes less as a result. In addition, calculating an arithmetic mean is advantageous, since this makes it possible to diminish the statistical fluctuations even further.

In some exemplary embodiments, a local minimum which satisfies a specific or predefined criterion is determined from the received backscatter histogram data that exceed a specific time threshold, so as to determine the ambient light quantity. As mentioned above, a constant ambient light quantity can be determined in some exemplary embodiments for larger distances (corresponding to the determined time threshold), if no reflections on objects have contributed to the received backscatter histogram data within this time range. In such exemplary embodiments, the ambient light quantity can correspond to a local minimum in the received backscatter histogram data that exceeds a specific time threshold.

Signal contributions made by reflections on objects typically have a specific signal form that can extend over several time intervals. If several objects are present for larger distances, the two signal forms can in some exemplary embodiments overlap each other in such a way that a local minimum arises that does not correspond to the ambient light quantity. In some exemplary embodiments, this is why only those local minimums were considered for determining the ambient light that satisfy a specific or predefined criterion, which represents the various possibilities for the presence of a local minimums in the received backscatter histogram data that exceed a specific time threshold. The local minimums can be classified based upon this criterion.

In some exemplary embodiments, the ambient light quantity can be determined by initially ascertaining and classifying a first local minimum (as of the time threshold). If the local minimum does not satisfy the requirements for determining the ambient light quantity according to the classification, a search can be performed for another local minimum in the received backscatter histogram data, wherein this local minimum comes after the time threshold and after the first local minimum in such exemplary embodiments. The search can correspondingly be continued until the end of the measurement time. If the local minimum satisfies the requirements for determining the ambient light quantity according to the classification, the ambient light quantity is determined as the local minimum. In some exemplary embodiments, determining the ambient light quantity involves the following steps:

Calculating an arithmetic mean from the received backscatter histogram data of several time intervals that lie before a starting time, so as to obtain a first ambient light quantity;

Determining a local minimum that satisfies a specific criterion from the received backscatter histogram data that exceed a specific time threshold, so as to obtain a second ambient light quantity; and Determining the ambient light quantity from a comparison between the first ambient light quantity and the second ambient light quantity, wherein the ambient light quantity is determined as the smaller of the two ambient light quantities.

An arithmetic mean is initially calculated for the first ambient light quantity from the received backscatter histogram data of several time intervals that lie before a starting time. This can be algorithmically expressed as min_ambient=first ambient light quantity, wherein min_ambient corresponds to a minimum to be determined for ambient light quantity. A local minimum in the received backscatter histogram data that exceeds a specific time threshold is subsequently determined, and corresponds to the second ambient light quantity. This can be written as current_far_ambient=second ambient light quantity. According to the above statements, this local minimum is classified according to a specific criterion. If the local minimum satisfies the requirements for determining the ambient light quantity according to the classification, the smaller of the two ambient light quantities is set as min_ambient. This can be algorithmically expressed as follows: min_ambient=min (min_ambient, current_far_ambient). If the local minimum does not satisfy the requirements for determining the ambient light quantity according to the classification, the next local minimum is determined as the second ambient light quantity and again classified, as described above, etc. If the end of the measurement time has been reached during the search, the ambient light quantity is set as AL=min_ambient.

As a consequence, the described method can correspond to a combination of two of the methods explained above. This can be advantageous, because statistical fluctuations and influences of distant objects are reduced as a result, so that the ambient light quantity can be determined more precisely.

In some exemplary embodiments, the effective detection range of the optical runtime measurement is determined with the help of a predefined function.

As mentioned above, the effective detection range can be determined based upon the backscatter signal (AB) and ambient light quantity (AL). In some exemplary embodiments, the predefined function can here be a predefined (mathematical) function, which calculates from the backscatter signal and ambient light quantity the effective detection range. In other exemplary embodiments, the predefined function can be a sequence of calculations. The predefined function can be experimentally determined, or gained from experience. This can be formally expressed as: DER=f(AL, AB), wherein f is the predefined function.

In some exemplary embodiments, the effective detection range of the optical runtime measurement is determined from a characteristic diagram.

A characteristic diagram can here be a table-like, simple type of representation of a model that is not very demanding in terms of required computing capacities, which images the relationship between input and output variables of a system. Characteristic diagrams can be used to represent nearly any mathematical relationship or any formula, wherein the number of input variables is limited. In some exemplary embodiments, the characteristic diagram can therefore be an image of the function f(AL, AB), which correspondingly has stored the values of the effective detection range for a large number of values of AL and AB. This is advantageous, since the determination of the effective detection range need not be calculated in such exemplary embodiments, thereby economizing on computing capacities.

As mentioned above, the effective detection range for the optical runtime measurements is in some exemplary embodiments determined from a comparison with predefined reference values.

Some exemplary embodiments relate to a device for data processing, comprising means for performing the steps of the method as explained herein. The device can here be built into a motor vehicle or realized in a component of the motor vehicle, e.g., in an onboard computer, a controller or the like. In addition, the means can comprise one or several (micro) processors, storage means and other electronic components, which typically are required for implementing the functions described herein.

Exemplary embodiments of the invention will now be described exemplarily and with reference to the attached drawing, in which:

FIG. 1 illustrates the first exemplary embodiment of a reference backscatter signal.

Figure 1:
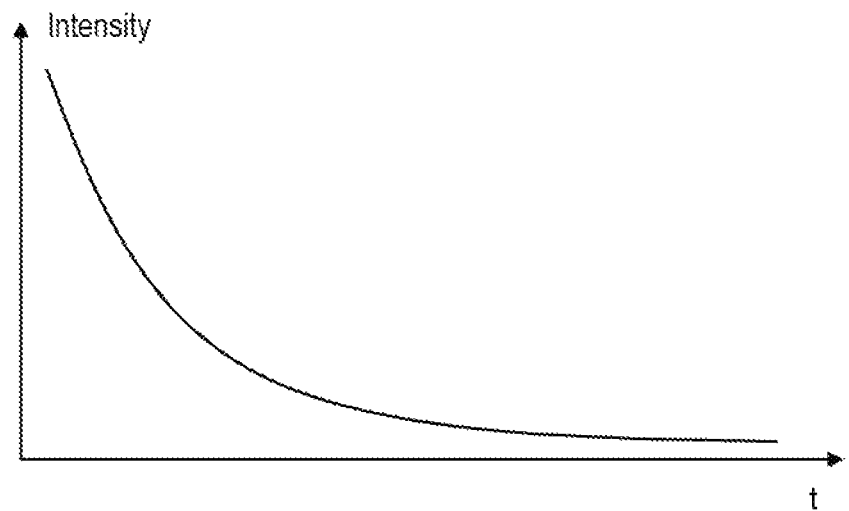
FIG. 1 illustrates a first exemplary embodiment of a reference backscatter signal.

The reference backscatter signal illustrated on FIG. 1 corresponds to a typical signal form of the kind that arises in a coaxial LIDAR system, i.e., in a LIDAR system in which there is no parallax between the transmitter and receiver. The reference backscatter signal (in other words, the intensity of the backscattered light) drops off monotonously over time.

Figure 2:
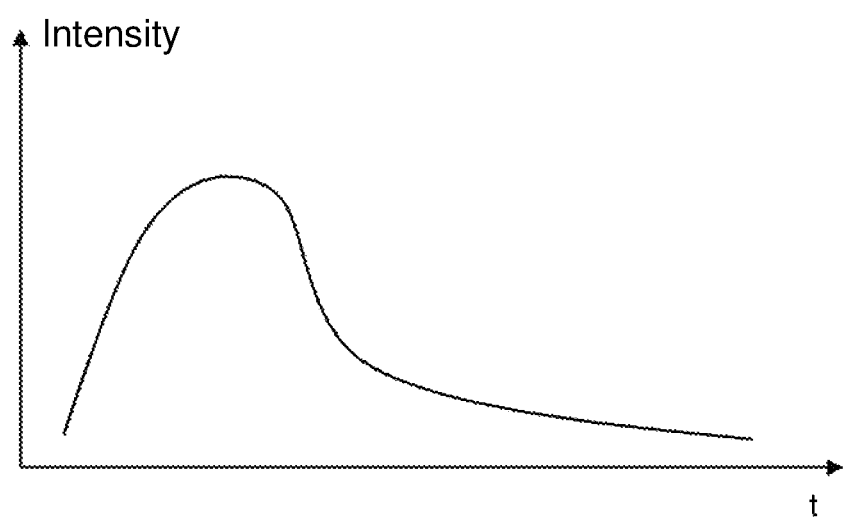
FIG. 2 illustrates a second exemplary embodiment of a reference backscatter signal.

FIG. 2 illustrates the second exemplary embodiment of a reference backscatter signal.

The reference backscatter signal illustrated on FIG. 2 corresponds to a typical signal form of the kind that arises in a biaxial single-beam LIDAR system. In biaxial systems (i.e., the transmitting and receiving system are at a defined distance, e.g., 10 cm, and have defined beam divergence), an overlap only arises as of a minimal distance (beginning of the signal rise of the reference backscatter signal). The reference backscatter signal thereafter drops according to the progression on FIG. 1. The reference backscatter signal has a low intensity at very small distances, and rises to a maximum, which subsequently drops off monotonously over time.

Figure 3:
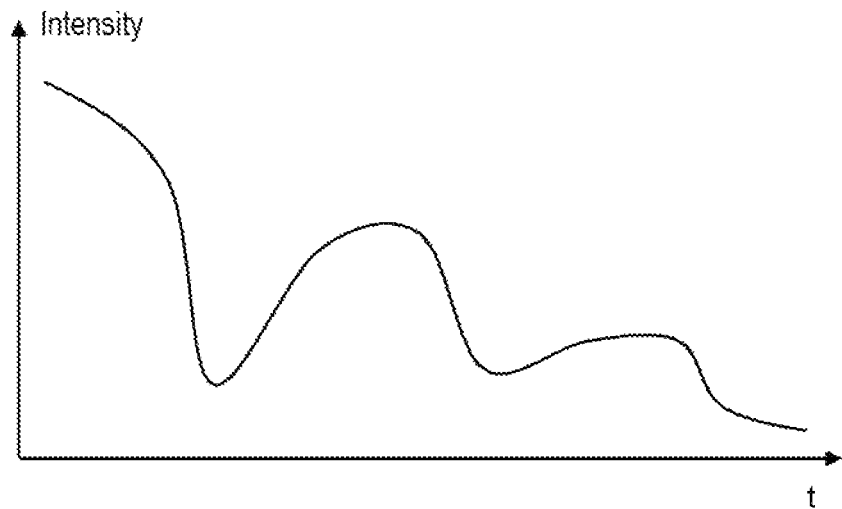
FIG. 3 illustrates a third exemplary embodiment of a reference backscatter signal.

FIG. 3 illustrates the third exemplary embodiment of a reference backscatter signal.

The reference backscatter signal illustrated on FIG. 3 corresponds to a typical signal form of the kind that typically arises in a biaxial multibeam LIDAR system (e.g., according to DE 10 2017 222 971 A1). The reference backscatter signal is similar to a biaxial single-beam LIDAR system, but has several maximums at distances where various beams cross the visual field of the light-detecting receiving elements. For larger distances, the intensity drops off monotonously over time.

Figure 4:
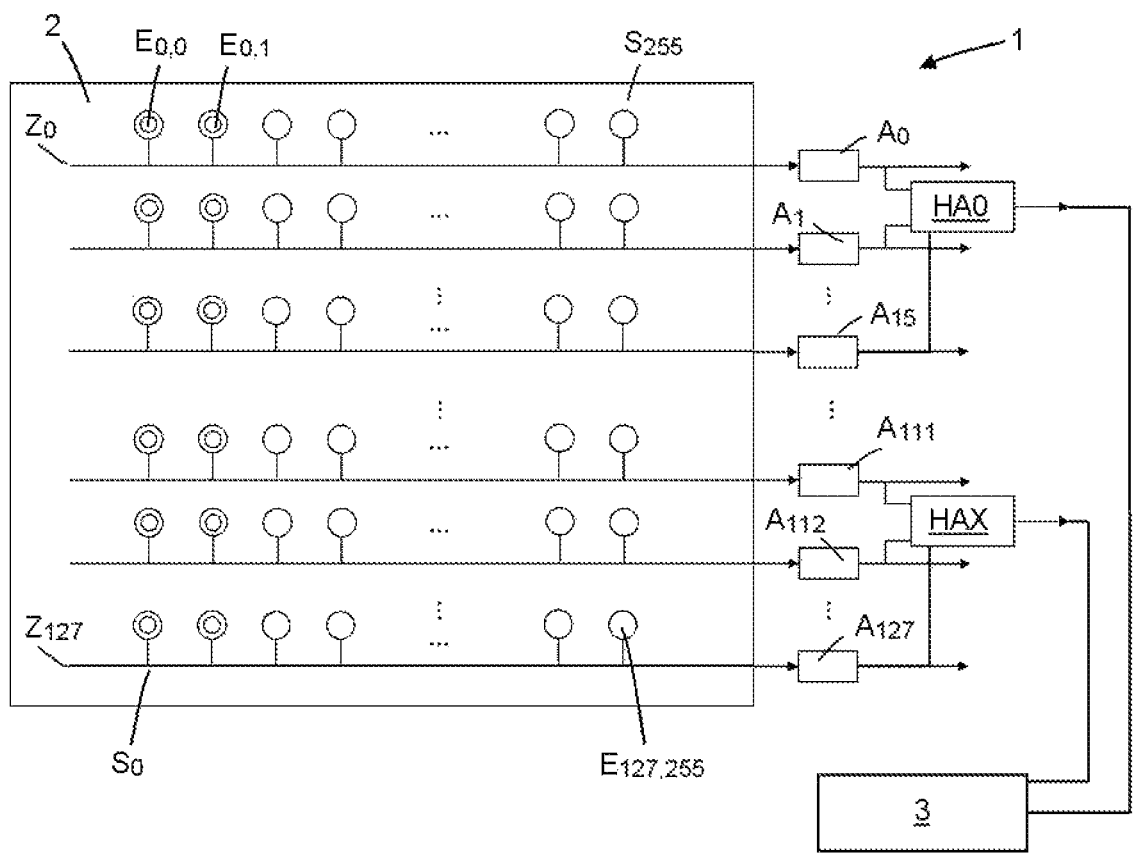
FIG. 4 illustrates a scheme of an embodiment for a receiving system for an optical distance measurement.

FIG. 4 illustrates a scheme of an exemplary embodiment of a receiving system 1 for an optical distance measurement.

The receiving system 1 has a receiving matrix 2, on which several light-detecting receiving elements (ENxM, in this exemplary embodiment E0,0 to E127,255) are arranged in rows (Z0 to Z127) and columns (S0 to S255). M=256 light-detecting receiving elements (E0.0 to E127.255) are arranged in each of the N=128 rows (Z0 to Z127) (corresponding to the M=256 columns (S0 to S255)). The light-detecting receiving elements (E0.0 to E127,255) are SPAD's in this exemplary embodiment.

The receiving system 1 further has several evaluation units (A0 to A127), wherein a respective evaluation unit (A0 to A127) is connected with the light-detecting receiving elements (E0.0 to E127.255) of a row (Z0 to Z127) via a multiplexer (not shown). In each row (Z0 to Z127), only the two light-detecting receiving elements (E0,0 and E0,1 to E127,0 and E127,1) are activated in the columns S0 and S1 at a given time (illustrated by the second circle within the light-detecting receiving elements (E0,0 and E0,1 to E127,0 and E127,1)). Upon the detection of light, the activated light-detecting receiving elements (E0,0 and E0,1 to E127,0 and E127,1) generate electrical signals, from which time-correlated histogram data are generated with the help of a time-to-digital converter (not shown) in each of the evaluation units (A0 to A127). In this exemplary embodiment, the time-correlated histogram data of the two activated light-detecting receiving elements (E0,0 and E0,1 to E127,0 and E127,1) are added together in the evaluation units (A0 to A127), so as to generate and output time-correlated histogram data. In other exemplary embodiments, any desired number of M=256 light-detecting receiving elements (E0,0 to E127,255) can be activated in each row, e.g., E0,0 to E0,10, E1,0 to E1,10, E2,0 to E2,10, . . . , E127,0 to E127,10.

The receiving system 1 further has several histogram accumulation units (HA0 to HAX). Each histogram accumulation unit (HA0 to HAX) has P=16 signal inputs (not explicitly shown), wherein each signal input is connected with a respective evaluation unit (A0 to A127). For this reason, X=N/P=8 histogram accumulation units are required in this exemplary embodiment at N=128 rows (Z0 to Z127), which correspondingly accumulate the time-correlated histogram data of P=16 evaluation units (A0 to A127). The time-correlated histogram data output by the evaluation units (A0 to A127) are transmitted to the histogram accumulation units (HA0 to HAX), so that the latter are received at the signal inputs. Based upon the received time-correlated histogram data, the histogram accumulation units (HA0 to HAX) generate backscatter histogram data. In this exemplary embodiment, the time-correlated histogram data received at each signal input are added together, so as to generate the backscatter histogram data.

The receiving system 1 further has a device 3 for data processing, which has a processor and storage elements (not shown). The histogram accumulation units (HA0 to HAX) output the generated backscatter histogram data, which are received by the device 3 for data processing. The device 3 for data processing analyzes the received backscatter histogram data. In this exemplary embodiment, the device 3 for data processing calculates a correlation between the received backscatter histogram data and the reference backscatter signal from FIG. 3, so as to determine a backscatter signal, for example one ascertained as a backscatter indicator or backscatter signal strength.

Figure 5:
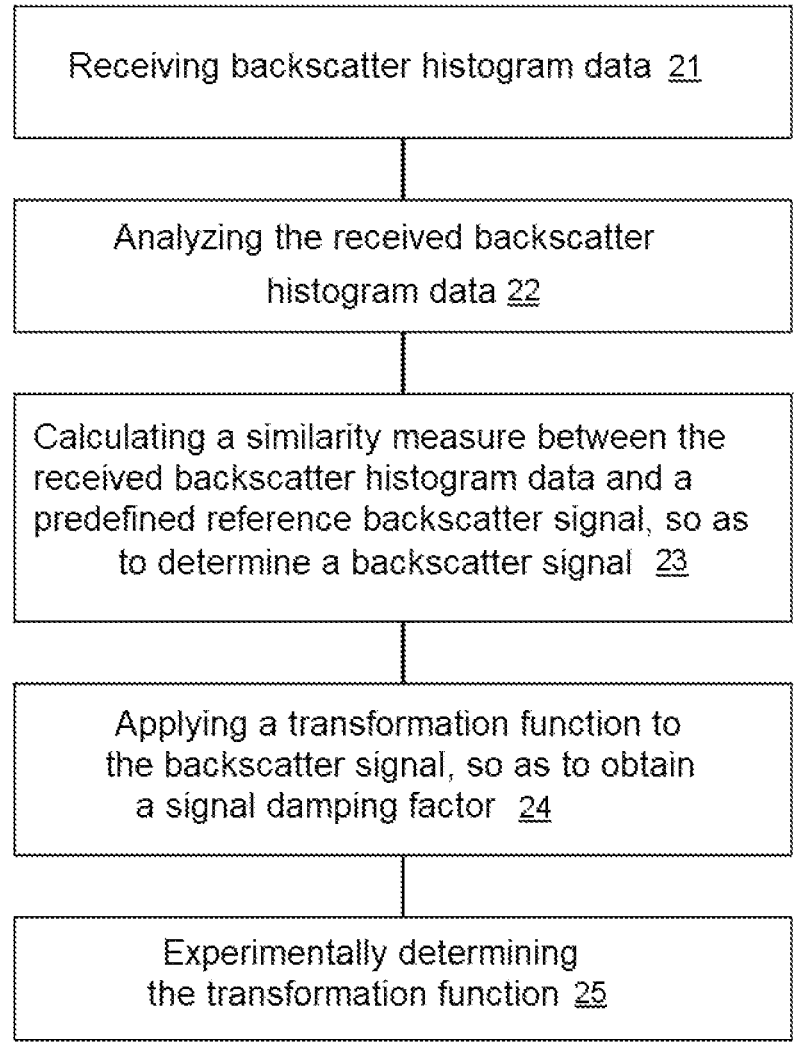
FIG. 5 illustrates a flowchart of a first exemplary embodiment of a method for analyzing backscatter histogram data during an optical runtime measurement.

FIG. 5 illustrates a flowchart of the first exemplary embodiment of a method 20 for analyzing backscatter histogram data during an optical runtime measurement.

Backscatter histogram data are received at 21, as explained herein.

The received backscatter histogram data are analyzed at 22, as explained herein.

A similarity measure between the received backscatter histogram data and a predefined reference backscatter signal is calculated at 23 so as to determine a backscatter signal, as explained herein.

A transformation function is applied to the backscatter signal at 24 so as to obtain a signal damping factor, as explained herein.

Wherein the transformation function from step 24 was experimentally determined (beforehand) at 25, as explained herein.

Figure 6:
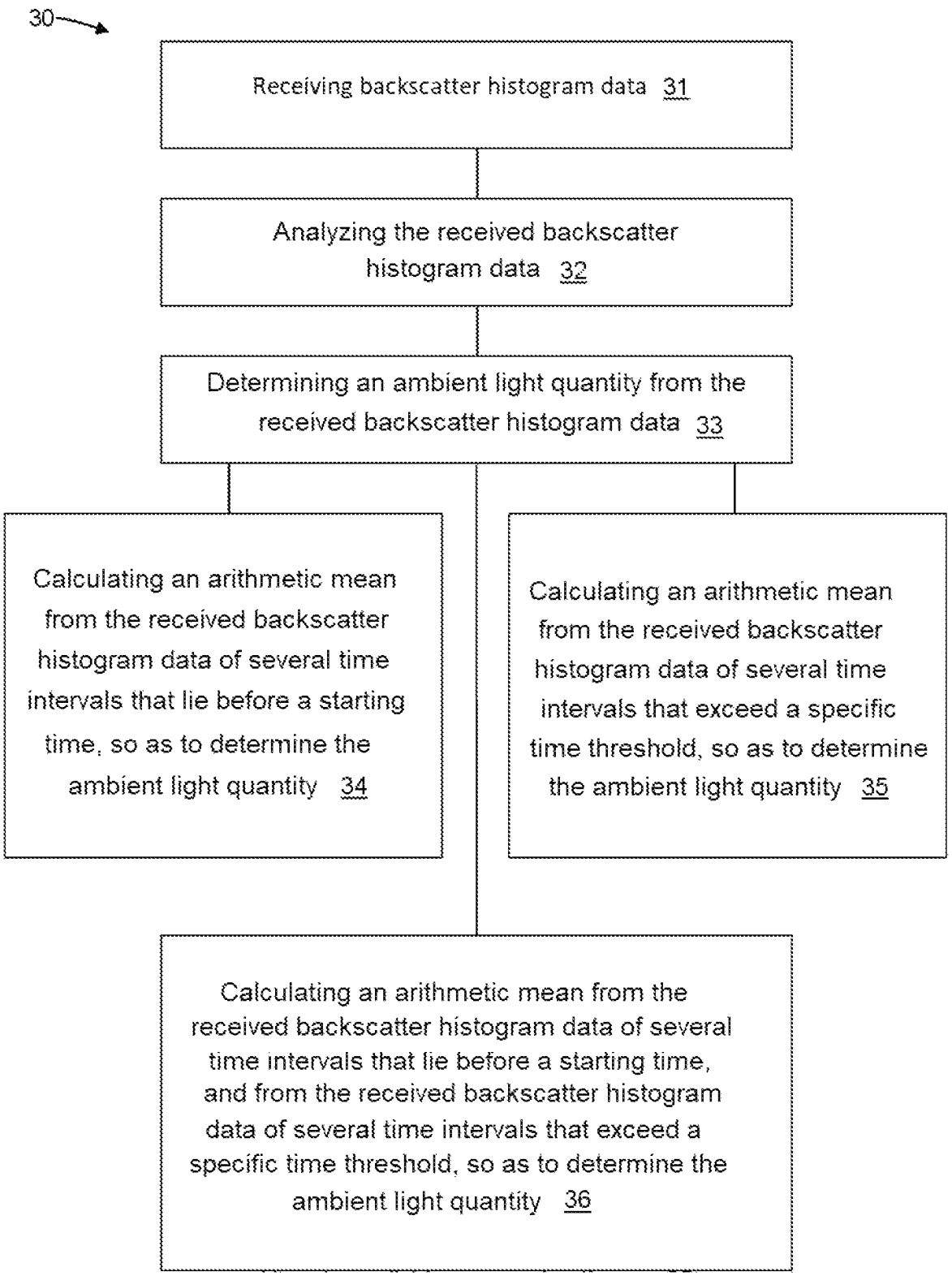
FIG. 6 illustrates a flowchart of a second exemplary embodiment of a method for analyzing backscatter histogram data during an optical runtime measurement.

FIG. 6 illustrates a flowchart of the second exemplary embodiment of a method 30 for analyzing backscatter histogram data during an optical runtime measurement.

Backscatter histogram data are received at 31, as explained herein.

The received backscatter histogram data are analyzed at 32, as explained herein.

An ambient light quantity is determined from the received backscatter histogram data at 33, as explained herein.

Steps 34 to 36 are options that are each implemented separately.

An arithmetic mean is calculated at 34 from the received backscatter histogram data of several time intervals that lie before a starting time, so as to determine the ambient light quantity, as explained herein.

An arithmetic mean is calculated at 35 from the received backscatter histogram data of several time intervals that exceed a specific time threshold, so as to determine the ambient light quantity, as explained herein.

An arithmetic mean is calculated at 36 from the received backscatter histogram data of several time intervals that lie before a starting time so as to determine the ambient light quantity, and from the received backscatter histogram data of several time intervals that exceed a specific time threshold, so as to determine the ambient light quantity, as explained herein.

Figure 7:
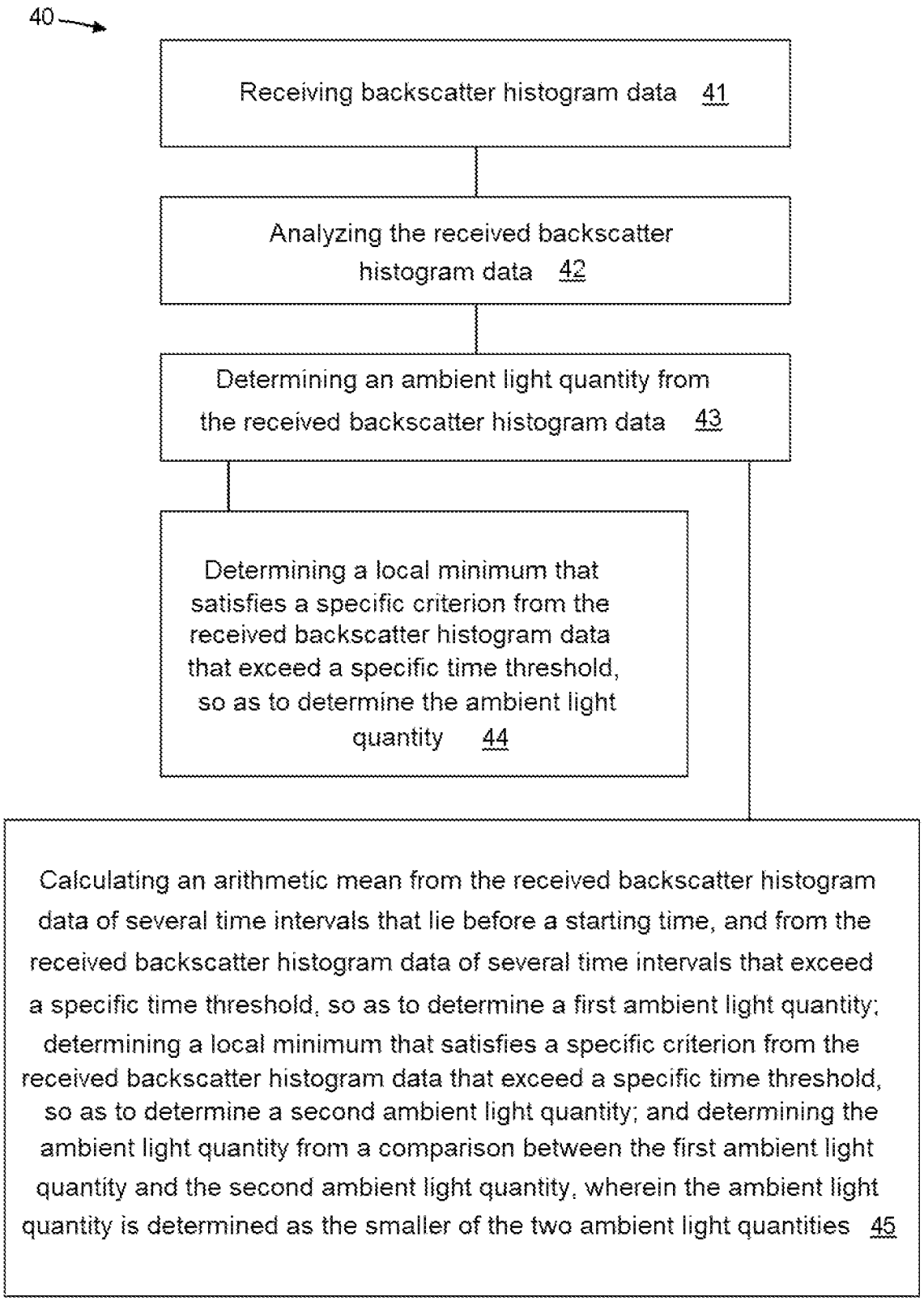
FIG. 7 illustrates a flowchart of a third exemplary embodiment of a method for analyzing backscatter histogram data during an optical runtime measurement.

FIG. 7 illustrates a flowchart of the third exemplary embodiment of a method 40 for analyzing backscatter histogram data during an optical runtime measurement.

Backscatter histogram data are received at 41, as explained herein.

The received backscatter histogram data are analyzed at 42, as explained herein.

An ambient light quantity is determined from the received backscatter histogram data at 43, as explained herein. Steps 44 and 45 are options that are each implemented separately.

A local minimum which satisfies a specific criterion is determined at 44 from the received backscatter histogram data that exceed a specific time threshold, so as to determine the ambient light quantity, as explained herein.

At 45, an arithmetic mean is calculated from the received backscatter histogram data of several time intervals that lie before a starting time as to obtain a first ambient light quantity, and a local minimum that satisfies a specific criterion is determined from the received backscatter histogram data that exceeds a specific time threshold, so as to determine a second ambient light quantity, and an ambient light quantity is determined from a comparison between the first ambient light quantity and second ambient light quantity, wherein the ambient light quantity is determined as the smaller of the two ambient light quantities, as explained herein.

Figure 8:
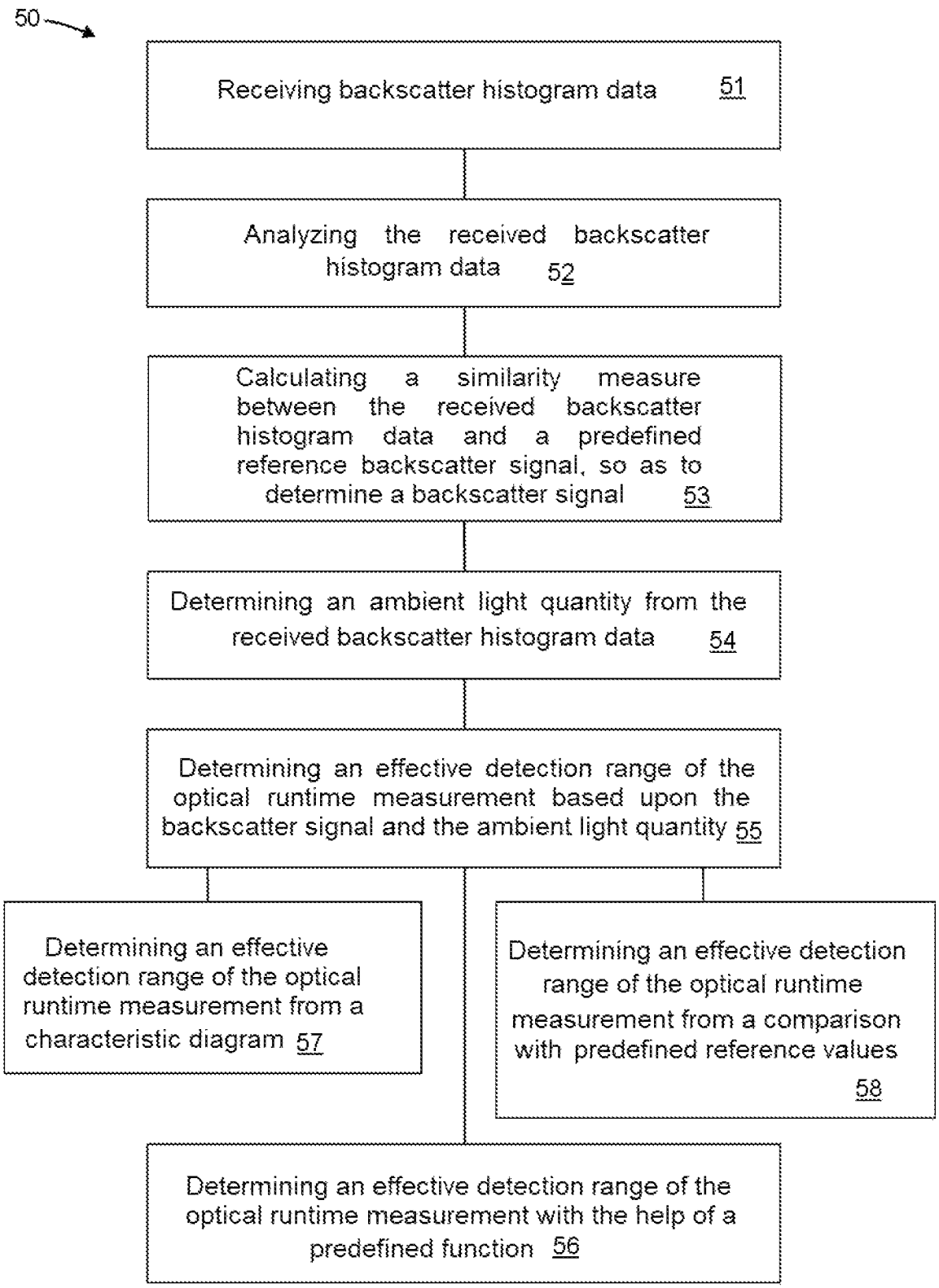
FIG. 8 illustrates a flowchart of a fourth exemplary embodiment of a method for analyzing backscatter histogram data during an optical runtime measurement.

FIG. 8 illustrates a flowchart of the fourth exemplary embodiment of a method 50 for analyzing backscatter histogram data during an optical runtime measurement.

Backscatter histogram data are received at 51, as explained herein.

The received backscatter histogram data are analyzed at 52, as explained herein.

A similarity measure between the received backscatter histogram data and a predefined reference backscatter signal is calculated at 53 so as to determine a backscatter signal, as explained herein.

An ambient light quantity is determined from the received backscatter histogram data at 54, as explained herein.

An effective detection range of the optical runtime measurement is determined at 55 based upon the backscatter signal, for example which is determined as the backscatter indicator or backscatter signal strength, and the ambient light quantity, as explained herein.

Steps 56 to 58 are options that are each implemented separately.

The effective detection range of the optical runtime measurement is determined at 56 with the help of a predefined function, as explained herein.

The effective detection range of the optical runtime measurement is determined at 57 from a characteristic diagram, as explained herein.

The effective detection range of the optical runtime measurement is determined at 58 from a comparison with predefined reference values, as explained herein.

The invention claimed is:

1. A method, comprising:
    emitting, by a light detection and ranging (LIDAR) device, a light pulse;
    activating, by the LIDAR device, a plurality of groups of light-detecting receiving elements, wherein each group in the plurality of groups are activated at different time intervals;
    creating, by a processor in the LIDAR device, a time-correlated histogram from signals produced by the light-detecting receiving elements at the different time intervals to produce a received backscatter histogram data;
    calculating, by the processor, a similarity measure between the received backscatter histogram data and a reference backscatter signal, wherein the reference backscatter signal represents diffuse backscatter and is predetermined independently from the signals produced by the light-detecting receiving elements at the different time intervals; and responsive to calculating the similarity measure, determining a backscatter signal indicating a strength of current diffuse backscatter at different ranges.

2. The method according to claim 1, wherein the calculating the similarity measure comprises:
correlating, by the processor, the received backscatter histogram data with the reference backscatter signal.

3. The method according to claim 1, further comprising:
determining, by the processor, an ambient light quantity from the received backscatter histogram data.

4. The method according to claim 3, further comprising:
determining, by the processor, an effective detection range for a runtime measurement based upon the backscatter signal and the ambient light quantity.

5. The method according to claim 1, further comprising:
applying, by the processor, a transformation function to the backscatter signal; and
responsive to the applying the transformation function, determining, by the processor, a signal damping factor.

6. The method according to claim 5, further comprising:
determining, by the processor, the transformation function experimentally.

7. The method according to claim 1, further comprising
calculating, by the processor, an arithmetic mean from the received backscatter histogram data of several time intervals that lie before a starting time; and
responsive to the calculating the arithmetic mean, determining, by the processor, an ambient light quantity.

8. The method according to claim 7, wherein the arithmetic mean is calculated from the received backscatter histogram data of several time intervals that exceed a specific time threshold.

9. The method according to claim 1, further comprising:
calculating, by the processor, an arithmetic mean from the received backscatter histogram data of several time intervals that lie before a starting time, so as to obtain a first ambient light quantity;
determining, by the processor, a local minimum that satisfies a specific criterion from the received backscatter histogram data that exceed a specific time threshold, so as to obtain a second ambient light quantity; and
determining, by the processor, an ambient light quantity from a comparison between the first ambient light quantity and the second ambient light quantity, wherein the ambient light quantity is determined as the smaller of the first ambient light quantity and the second ambient light quantity.

10. A non-transitory machine-readable medium comprising executable instructions that, when executed by a computer, facilitate performance of operations, the operations comprising:
emitting a laser light pulse;
activating a plurality of groups of light-detecting receiving elements, wherein each group in the plurality of groups are activated at different time intervals;
creating a time-correlated histogram from signals produced by the light-detecting receiving elements at the different time intervals to produce a received backscatter histogram data;
calculating a similarity measure between the received backscatter histogram data and a reference backscatter signal, wherein the reference backscatter signal represents diffuse backscatter and is predetermined independently from the signals produced by the light-detecting receiving elements at the different time intervals; and
responsive to calculating the similarity measure, determining a backscatter signal indicating a strength of current diffuse backscatter at different ranges.

11. The non-transitory machine-readable medium of claim 10, wherein the calculating the similarity measure comprises:
correlating the received backscatter histogram data with the reference backscatter signal.

12. The non-transitory machine-readable medium of claim 10, wherein the operations further comprise:
determining an ambient light quantity from the received backscatter histogram data.

13. The non-transitory machine-readable medium of claim 12, wherein the determining the ambient light quantity comprises:
calculating an arithmetic mean from the received backscatter histogram data of several time intervals that lie before a starting time; and
determining the ambient light quantity responsive to the arithmetic mean.

14. The non-transitory machine-readable medium of claim 13, wherein the arithmetic mean is calculated from the received backscatter histogram data of several time intervals that exceed a specific time threshold.

15. The non-transitory machine-readable medium of claim 10, wherein the operations further comprise:
calculating an arithmetic mean from the received backscatter histogram data of several time intervals that lie before a starting time, so as to obtain a first ambient light quantity;
determining a local minimum that satisfies a specific criterion from the received backscatter histogram data that exceed a specific time threshold, so as to obtain a second ambient light quantity; and
determining an ambient light quantity from a comparison between the first ambient light quantity and the second ambient light quantity, wherein the ambient light quantity is determined as the smaller of the first ambient light quantity and the second ambient light quantity.

16. A device comprising:
a light emitting element;
a plurality of groups of light-detecting receiving elements;
a processor; and
a memory coupled to the processor, the memory including instructions store thereon that, when executed by the processor, facilitate performance of operations, the operations comprising:
emitting, by the light emitting element, a light pulse;
activating the plurality of groups of the light-detecting receiving elements, wherein each group in the plurality of groups are activated at different time intervals;
creating a time-correlated histogram from signals produced by the light-detecting receiving elements at the different time intervals to produce a received backscatter histogram data;
calculating a similarity measure between the received backscatter histogram data and a reference backscatter signal, wherein the reference backscatter signal represents diffuse backscatter and is predetermined independently from the signals produced by the light-detecting receiving elements at the different time intervals; and
responsive to the calculating the similarity measure, determining a backscatter signal indicating a strength of current diffuse backscatter at different ranges.

17. The device of claim 16, wherein the calculating the similarity measure comprises:
   correlating the received backscatter histogram data with the reference backscatter signal.

18. The device of claim 16, wherein the operations further comprise:
   determining an ambient light quantity from the received backscatter histogram data.

19. The device of claim 16, wherein the operations further comprise:
   applying a transformation function to the backscatter signal; and
   responsive to the applying the transformation function, determining a signal damping factor.

20. The device of claim 19, wherein the operations further comprise:
   determining the transformation function experimentally.

* * * * *